UNITED STATES PATENT OFFICE.

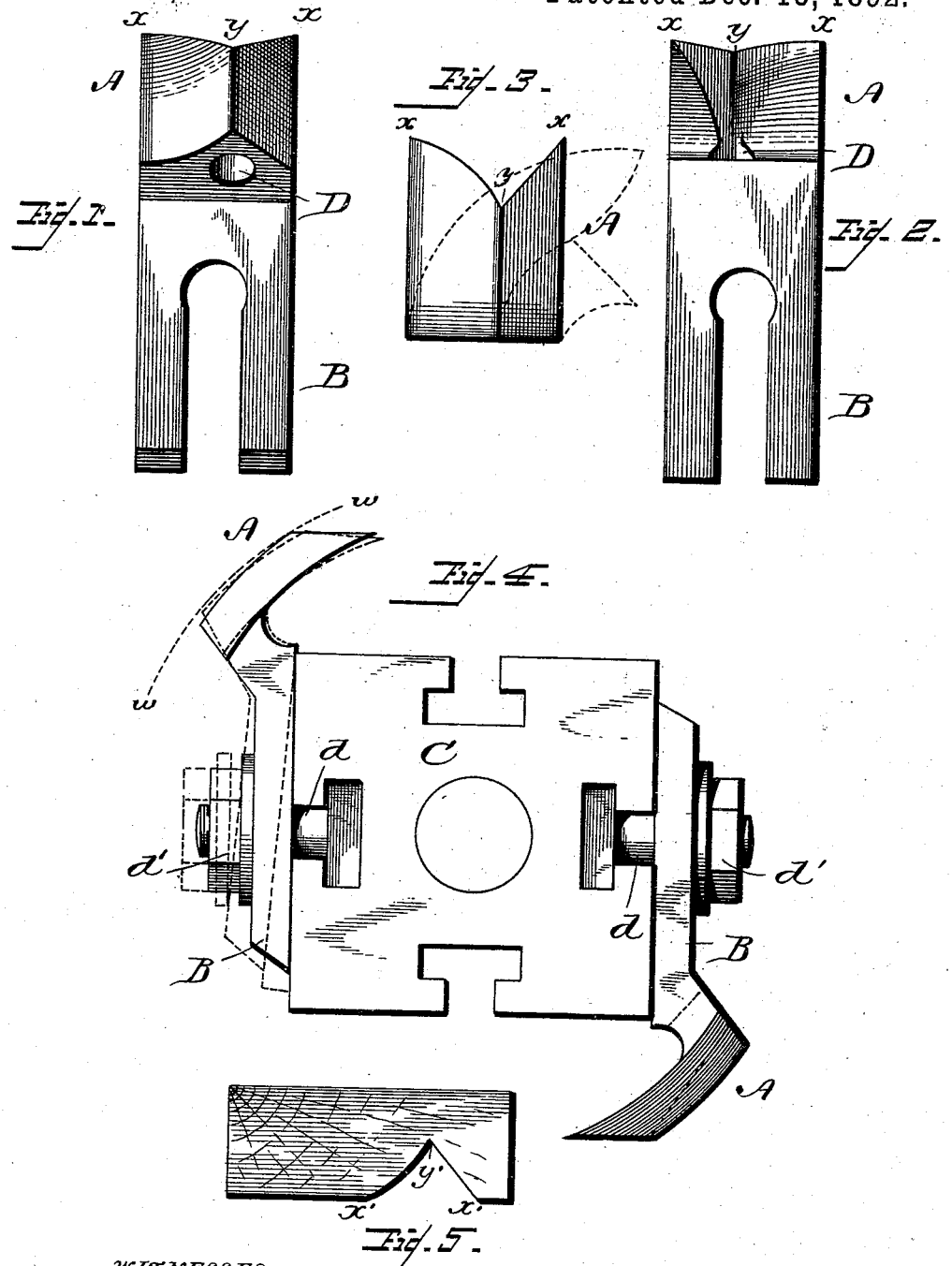

EDWIN GOLLINS, OF COLUMBUS, OHIO.

DADO OR MOLDING BIT.

SPECIFICATION forming part of Letters Patent No. 487,921, dated December 13, 1892.

Application filed April 20, 1892. Serial No. 429,896. (No model.)

*To all whom it may concern:*

Be it known that I, EDWIN GOLLINS, a citizen of the United States, residing at Columbus, in the county of Franklin and State of Ohio, have invented certain new and useful Improvements in Dado or Molding Bits; and I do hereby declare the following to be a full, clear, and exact description of the invention, such as will enable others skilled in the art to which it appertains to make and use the same.

The flat bits for forming dados, moldings, rosettes, and the like heretofore in general use cut with a scraping or tearing action, and the product is consequently rough and unfinished in appearance. This is most emphatically true when the molding extends across the grain of the wood.

The object of my invention is to provide a bit that will cut in any direction with respect to the grain of the wood and produce uniformly-excellent results.

My invention is embodied in a bit having its blade troughed or concaved outwardly and also curved in a direction nearly coincident with its path of motion and its cutting-edge formed in a plane inclined inwardly toward the axis of rotation from a tangent plane touching the deeper-cutting portion of the edge, whereby the blade cuts with a direct and shearing action, beginning at the shallow or elevated parts of the molding and proceeding to the deeper of each cross-section of the wood.

In the accompanying drawings, Figure 1 represents a rear view of a bit made in accordance with my invention; Fig. 2, a face view; Fig. 3, a top plan view of the cutting part or blade of the bit. Fig. 4 is an end view of an ordinary cutter-head having a pair of my bits applied, and Fig. 5 is a sectional view of a piece of simple molding added for the purpose of illustration.

Like letters in the different figures denote corresponding parts.

A designates the blade or cutting part of the bit, and B the shank.

The blade A is formed to cut any design of molding and is curved in the direction of its motion. The cutting-edges are so formed that the portions for cutting the shallow parts of the groove or cove are in advance of those for cutting the deeper parts, and hence the bit cuts with a "shear" cut. To illustrate more particularly, the point $x$, which cuts the shallowest part of the molding, will strike the material first, and the point $y$, which cuts the deepest part thereof, will strike last on each cross-section of the material, so that the action of the cutting-edge from the point $x$ to the point $y$ (see Fig. 5) is a shear cut. The action is substantially the same whether the cut surface be convex, plane, or concave.

The letter C designates an ordinary head, and my bits may be fastened to the same by bolts $d$ and nuts $d'$, as usual with other bits.

I obtain the curvature of the blade by tilting with a wedge the rear part of a bit-blank on the head C, as shown by the broken lines at the left-hand side of Fig. 4, and then cutting on a metal-planing machine the desired form of the blade, the head C being rotated on an arbor. When the wedge is removed and the bit secured with its face flat against the head, there will be a gradually-widening clearance from the cutting-edges backward, as indicated by the dotted arc $w\ w$.

By curving the cutting-blade as described the action of the cutting-edge is made nearly coincident with the direction of its movement, and hence the cutting action is more nearly direct, and by forming the cutting-edge so that it cuts from the shallow to the deep part of the groove on each cross-section the cut is shear and the difficulty hitherto experienced in cutting molding across the grain overcome.

To cut rosettes, I curve the blade, as shown by dotted lines in Fig. 3, to make it coincide with the direction of elevations and depressions on the face of the rosette. When the blade is formed as indicated by the dotted lines in this figure, the position of the shank of the bit will of course be modified and it will be attached, so that the blade will move in its proper direction. The hole D permits the use of a sharpening-tool on the under side of the cutting-edge.

Having thus described my invention, what I claim, and desire to secure by Letters Patent, is—

A bit for rotary cutters for forming molding, dado, and similar work, having its cutting-blade troughed or concaved outwardly and also curved in a direction nearly coincident with its path of motion and its cutting-edge formed in a plane inclined inwardly toward the axis of rotation from a tangent plane touching the deeper-cutting portion of the edge, substantially as shown and described.

In testimony whereof I affix my signature in presence of two witnesses.

EDWIN GOLLINS.

Witnesses:
E. O. RICKETTS,
GEO. M. FINCKEL.